United States Patent [19]
Morcos

[11] Patent Number: 5,305,099
[45] Date of Patent: Apr. 19, 1994

[54] WEB ALIGNMENT MONITORING SYSTEM

[75] Inventor: Joseph A. Morcos, 997 Old Eagle School Rd., Ste. 205, Wayne, Pa. 19087

[73] Assignee: Joseph A. Morcos

[21] Appl. No.: 984,916

[22] Filed: Dec. 2, 1992

[51] Int. Cl.[5] .............................. H04N 7/18
[52] U.S. Cl. ................................ 348/88; 348/95
[58] Field of Search .............. 358/101, 106, 107; 382/8; H04N 7/18

[56] References Cited

U.S. PATENT DOCUMENTS

| | | | |
|---|---|---|---|
| 2,203,706 | 6/1940 | Stockbarger | 271/2.6 |
| 2,486,334 | 10/1949 | Slamar | 250/235 |
| 3,567,853 | 2/1971 | Green | 178/6.8 |
| 4,539,561 | 9/1985 | Wulff | 358/106 |
| 4,581,632 | 4/1986 | Davis et al. | 358/107 |
| 4,614,430 | 9/1986 | Hara et al. | 382/8 |
| 4,757,550 | 7/1988 | Uga | 358/101 |
| 4,951,223 | 8/1990 | Wales et al. | 358/106 |
| 4,989,164 | 1/1991 | Desrousseaux | 358/107 |
| 5,051,825 | 9/1991 | Cochran et al. | 358/106 |
| 5,204,739 | 4/1993 | Domenicali | 358/107 |

OTHER PUBLICATIONS

North American Manufacturing Company, Bulletin 10032-6.00, Mar. 1990, "Capacitance-Type Automatic Center Guide for Strip Processing Lines".

Primary Examiner—Tommy P. Chin
Assistant Examiner—Richard Lee
Attorney, Agent, or Firm—Howson and Howson

[57] ABSTRACT

Apparatus for monitoring the lateral movement of a traveling web comprises at least two cameras connected to an image reproducing split-screen monitor whereby the images are juxtaposed for comparison of web edge alignment.

13 Claims, 3 Drawing Sheets

WEB ALIGNMENT MONITORING SYSTEM

BRIEF SUMMARY OF THE INVENTION

This invention relates to apparatus for monitoring the lateral movement of a traveling web. The invention relates more particularly to a closed circuit television system for the continuous detection of minute lateral shifts in the web.

The invention is especially suitable for use in a process in which a web of material, such as an elongated strip of textile, paper or metal, passes through a machine in the performance of an operation. The relative lateral alignment of the web to the machine is critical, for example, in a web traveling from supply reel over guide and steering rollers in a printing, slitting, cutting or plating process.

Lateral displacement of a web is prevented by adjustment of a steering roller over which the web travels. The steering roller may be controlled manually, or automatically by a feedback control system. To determine the proper adjustment of the steering roller, the lateral position of the traveling web is monitored and the extent of misalignment determined.

Typical applications in which a monitoring system is used in conjunction with a steering roller to position a web properly are the alignment of a web of paper relative to a printing roll, the alignment of a metal strip in a plating machine, and the alignment of textile material in cutting equipment.

Some prior art monitoring systems use optical devices for detecting web alignment. One system projects a beam of light across the edge of the web material or across a marking on the web material, and a photoelectric cell responds to the reflected light. If the light intensities of the illuminated areas on the two sides of the edge or line deviate from each other a given amount, the photoelectric cell senses the deviation and produces an output signal. In response to the output signal, the steering roller adjusts the web and causes its lateral position to progress from the location at which the edge or marking was sensed to a predetermined location along its path.

The monitoring function is intermittent and does not provide a human operator continuous visual monitoring capability. Further, the reflective characteristics and the width of a particular web material can vary and adversely affect the performance of the monitoring system.

Another prior art system uses a single television camera aimed obliquely at the web material to provide an operator with an extended view of the web. The reproduced image is a perspective view of the web. However, with the single camera monitoring system, detection by the operator of minute lateral displacement of the web is difficult. Also, complex electronic circuitry would be required to perform automatic monitoring of the video signal for proper web positioning. In addition, an unobstructed view of a long portion of the web is required in order for lateral displacement of the web to be discerned.

Accordingly, it is an object of the invention to provide continuous monitoring of lateral movement of the web and to improve the accuracy of detection of minute lateral shifts in the web. Another object of the invention is to allow minute shifts in the lateral movement of the edge of a web to be visually detectable by a human operator. A further object of the invention is to provide a monitoring system usable with webs made of a large variety of materials with different widths and reflective characteristics.

The invention addresses these and other objects by optical means arranged to compare the lateral positions of a web at two locations along its path. In one embodiment, a camera is arranged at each location to pick up an image of the web in a frame wider than the entire width of the web so that both edges of the web are included. The cameras transmit video signals to a single display monitor to reproduce the images in juxtaposition to each other for comparison of the lateral positions of the web edge. If the cameras are arranged to scan only one edge of the web, they must both scan the same edge (i.e. both cameras scan the right edge or the left edge). The video signals can also be transmitted to an electronic circuit for electronic comparison to produce an alarm or steering roller control signal.

The invention provides continuous monitoring. Video signals transmitted to the monitor allow the juxtaposition of two images for easy visual detection, by an operator, of minute shifts in the web edge. The invention can be used on many web materials and widths. The camera can be positioned at any desired location along the path of the web, and can be positioned for optimum sensitivity to small lateral displacements of the web.

Other objects, features and advantages of the invention will become apparent from the following detailed description when read in conjunction with the accompanying drawings.

DETAILED DESCRIPTION

Figure 1:
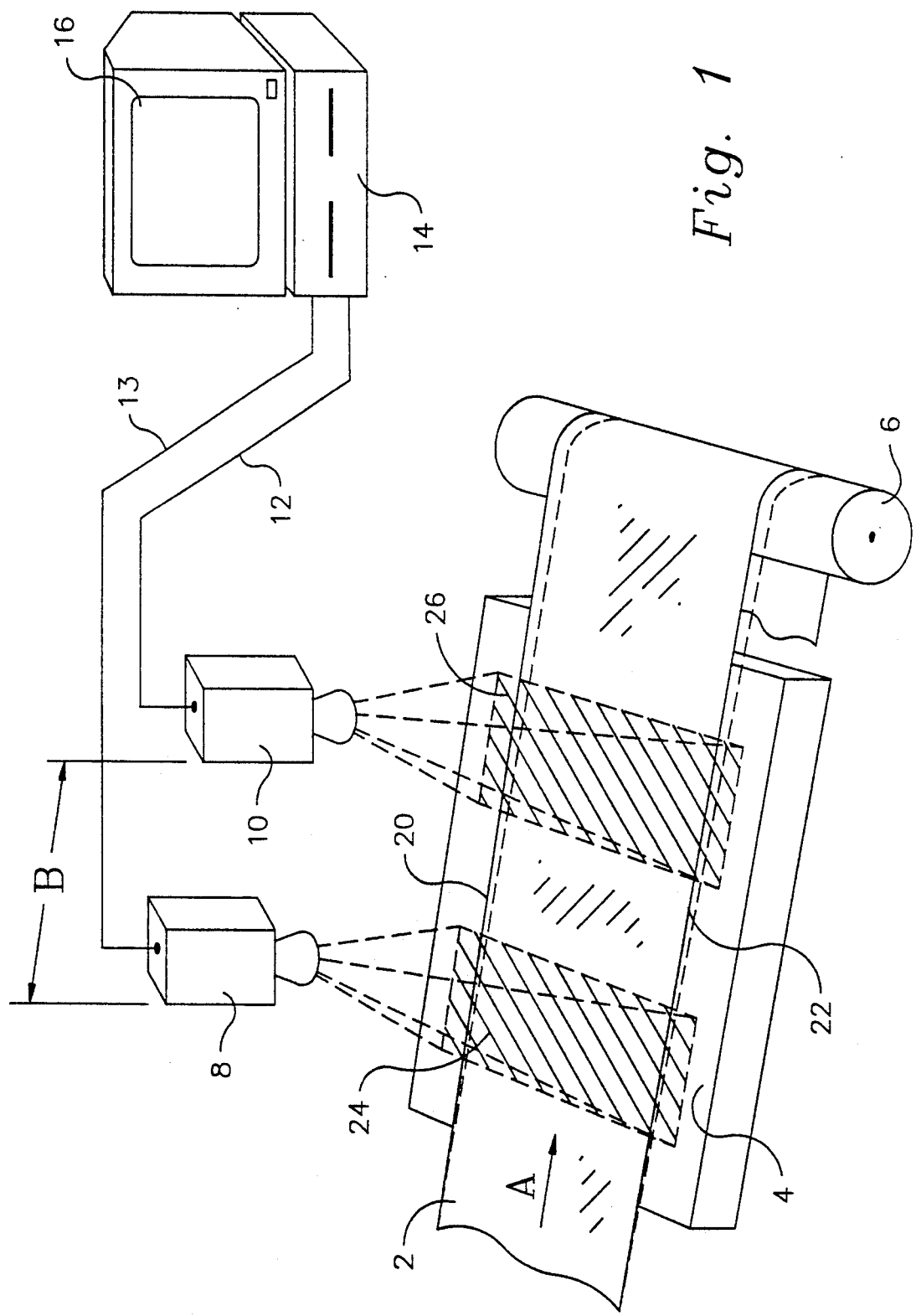
FIG. 1 is a perspective view of a monitoring system according to the invention including dual cameras and a split-screen monitor.

FIG. 1 illustrates a web 2 of material traveling in a direction "A" across a stationary flat plate 4. Plate 4 is located in a path to a machine and has sides extending beyond the edges 20 and 22 of web 2. The top surface of plate 4 provides a contrasting background for web 2. For example, if the web is white, the surface of plate 4 can be black.

The machine can be any machine for performing an operation on web 2. Typically, the alignment of web 2 in the machine is critical. For example, the machine may be a printing press and in order for the print to have a uniform margin, the edge of the web must be continuously aligned precisely with the printing roll.

Web 2 winds over a steering roller 6 rotatable on an axis and downstream of plate 4. The axis of steering roller 6 is movable to provide for lateral adjustment of the positions of edges 20 and 22 of web 2.

Video cameras 8 and 10 are located a distance "B" from each other along the path of web 2 at substantially equal heights above the path of web 2. Distance "B" can be varied depending on accessibility of the web and on the precision required in the detection of lateral movement of edges 20 and 22. Greater precision can be achieved by increasing distance "B".

Cameras 8 and 10 are arranged to scan areas 24 and 26, respectively. Video signals are generated by cameras 8 and 10. The video signals are sent via lines 12 and 13 to monitor 14 which continuously traces the information on monitor screen 16. Edges 20 and 22 in areas 24 and 26 are displayed on screen 16 in vertical juxtaposition to one another as shown in FIGS. 2 and 3.

The juxtaposed images are produced by split-screen switching. The two received video signals are merged into one signal with the first half of a frame being generated by camera 8 and the second half of the frame being generated by camera 10. The resulting trace on screen 16 consists of a top half, showing the image of area 24 scanned by camera 8, and a bottom half, showing the image of area 26 scanned by camera 10.

Figure 2:
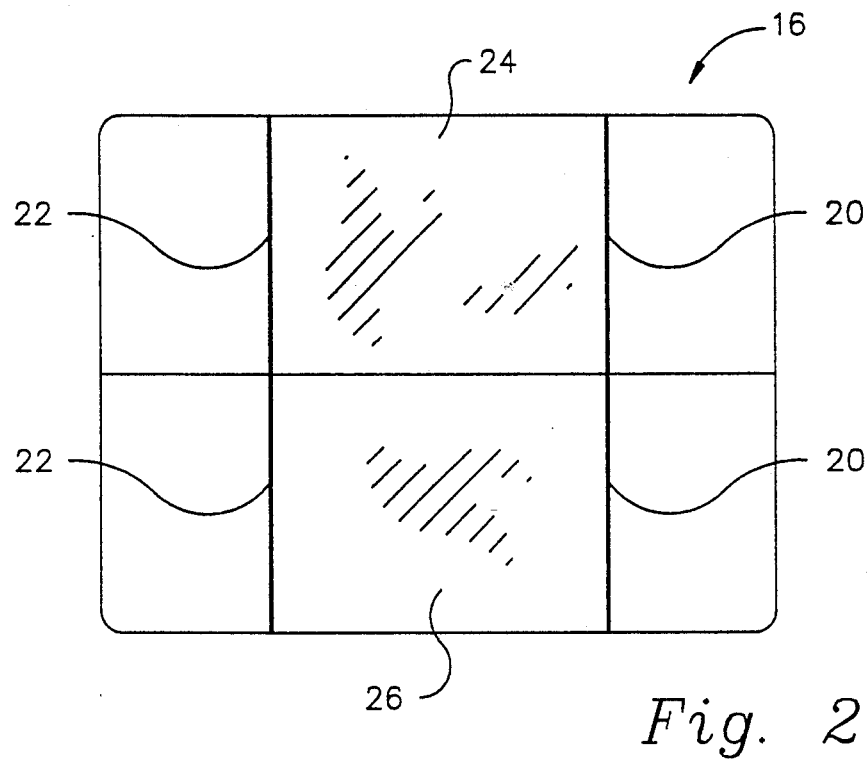
FIG. 2 shows a typical image appearing on a monitor when the web is properly aligned.

FIG. 2 shows a typical display on screen 16 when edges 20 and 22 are properly aligned. Edges 20 and 22 appear as substantially continuous parallel lines from the top to the bottom of screen 16.

Figure 3:
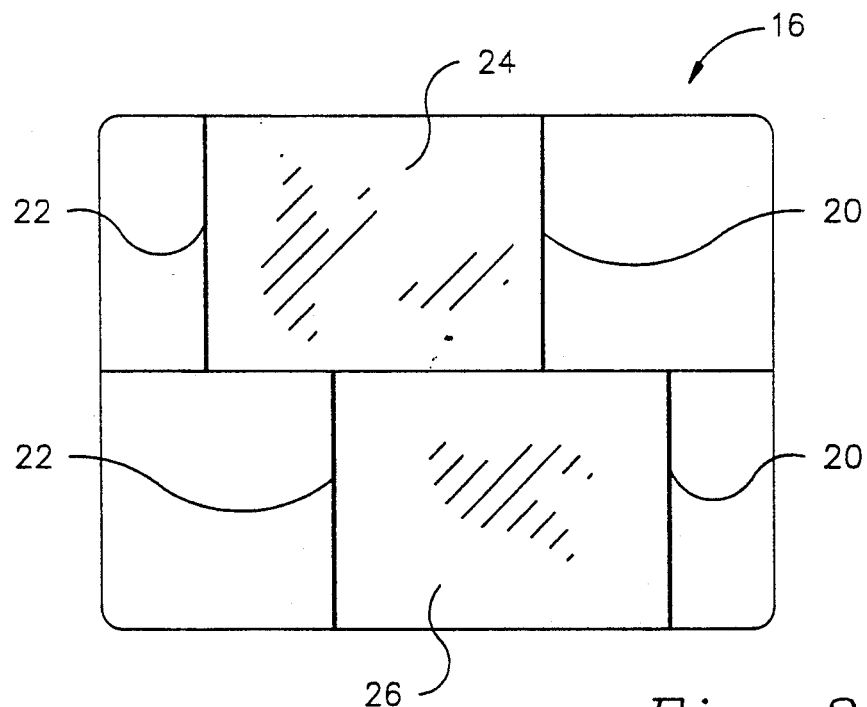
FIG. 3 shows a typical image on a monitor when misalignment occurs.

FIG. 3 shows a typical display on screen 16 when web 2 is not properly aligned. Each of edges 20 and 22 is broken at the middle of the monitor screen. The discontinuities in edge 20 and 22 visually indicates that the axis of rotation of steering roller 6 should be adjusted. The operator can view images while adjusting steering roller 6 for precise lateral placement of the web.

The monitoring system allows for continuous monitoring of web 2 and precise detection, by an operator, of minute lateral movements of edges 20 and 22. The monitoring system can be used on webs of various widths.

A number of modifications can be made in the invention described above. For example, the cameras can be focused to cover an area including only one edge of the web instead of on two edges. Of course, both cameras should focus on the same edge of the web. The cameras allow comparison of images of two longitudinally spaced parts of the same single edge of the web.

The height at which the cameras are fixed above the path of the web can also be adjusted, as can the magnification of the camera lens and the image reproduction apparatus. For longer web paths, additional cameras can be used to transmit multiple video signals to a single monitor.

The receiving, processing and communicating of the video information can be carried out in many ways. The video signals from the cameras can be processed electronically to produce a white image on the monitor screen with a single black line.

In an alternative embodiment, the video signals can be processed electronically to produce an electronic signal, thereby eliminating the video monitor altogether. The electronic signal can be read out by means of a digital or analog meter or other display.

Figure 4:
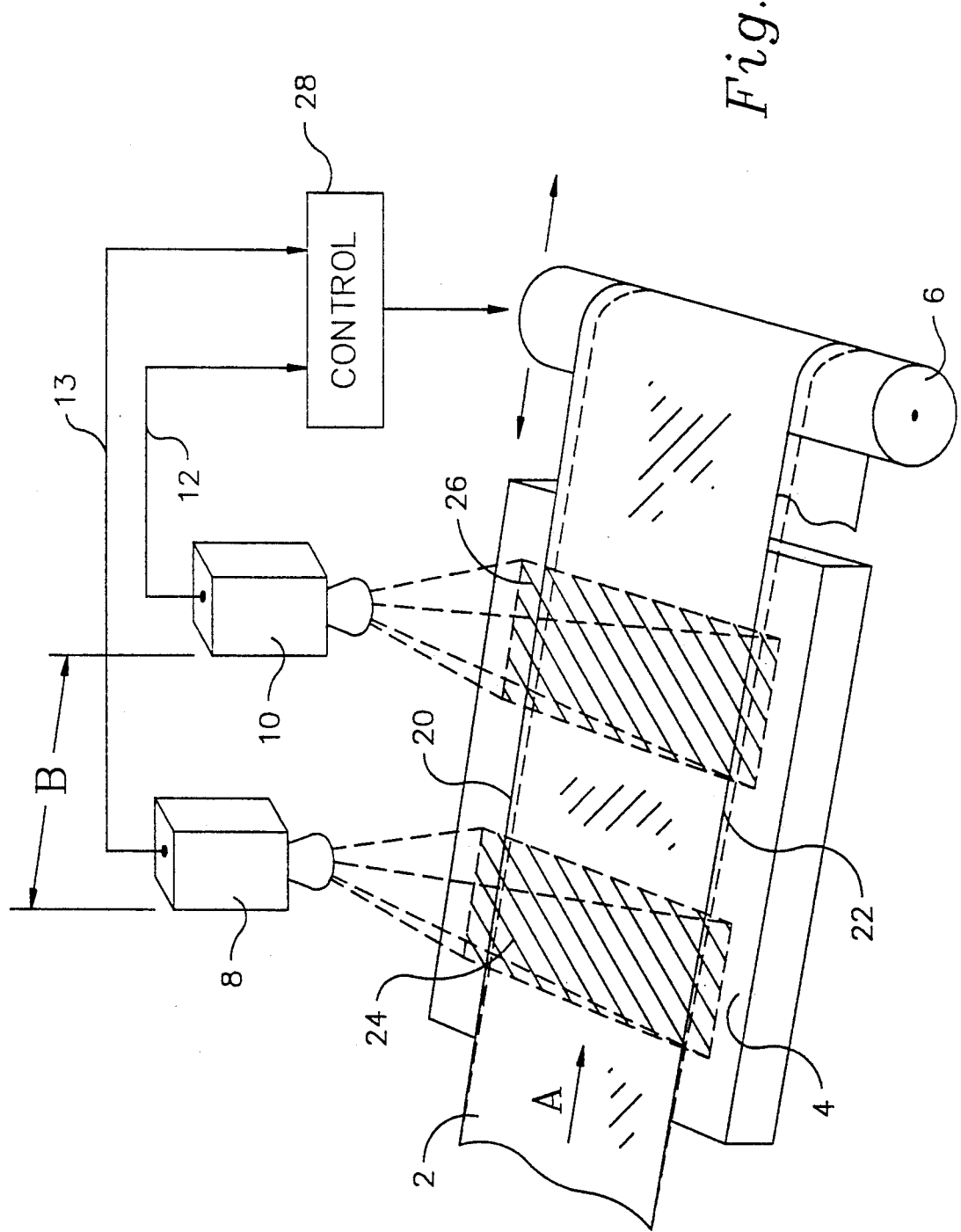
FIG. 4 is a perspective view of an alternate embodiment of a monitoring system according to the invention including dual cameras and a controller.

FIG. 4 shows an alternate embodiment utilizing a controller 28 receiving the output of cameras 8 and 10 via lines 12 and 13. Controller 28 is used to generate a feedback control signal to effect adjustment of steering roll 6. The feedback signal is generated by video signal processing in which the times of occurrence of video signals corresponding to the web edges are compared to each other with reference to the horizontal sync pulses generated by the cameras, which are synchronized with each other. A comparison of two video signals during a specific clock interval relative to the horizontal sync pulses, provides an indication of the difference in the lateral positions of two longitudinally spaced portions of the web. The extent of the difference determines the appropriate adjustment to the steering roll.

Other modifications, which will occur to persons skilled in the art, can be made without departing from the scope of the invention as defined in the following claims.

I claim:

1. Apparatus for detecting a lateral alignment of a longitudinally moving web comprising:
   first means, responsive to a lateral positioning of the web at longitudinally spaced locations along a path of movement of the web, for generating plural signals, each of said signals representing a lateral position of the web at one of said spaced locations; and
   second means, connected to said first means, for receiving said signals and responsive to said signals for indicating lateral displacement of one portion of the web relative to another.

2. Apparatus according to claim 1 in which said first means comprises a plurality of video cameras.

3. Apparatus according to claim 1 in which said first means comprises a plurality of sensing means located to sense the positions of different portions of the same edge of the web.

4. Apparatus according to claim 1 in which said first means comprises at least two image pickup means longitudinally spaced from one another and spaced from the surface of the web, and arranged to pick up images of at least one edge of the web; and said second means comprises a display means, connected to said pickup means, for producing images of said web in juxtaposition to one another, whereby the extent of lateral misalignment of the web is indicated by misalignment of the images of said edge.

5. Apparatus according to claim 4 in which said display means comprises a split screen monitor.

6. Apparatus according to claim 4 in which said at least two image pickup means comprises a first camera, positioned to scan a first portion of the surface of the web, for generating a video signal representing a lateral position of the web at one of said spaced locations, and a second camera, positioned to scan a second portion of the surface of the web, for generating a video signal representing a lateral position of the web at another of said spaced locations; and said display means comprises a monitor, connected to said first and second cameras, to receive said video signals, for displaying images of said first and second portions in juxtaposition to one another, whereby lateral shifts in said first and second portions can be visually detected by comparing said juxtaposed images on said display means.

7. Apparatus for detecting a lateral alignment of a longitudinally moving web comprising:
   at least two image pickup means longitudinally spaced from one another, located above the surface of the web, and arranged to pick up images of at least one edge of the web and generate signals depicting the images; and
   means, connected to said pickup means, for receiving said signals, processing web alignment information contained within said signals, and communicating said web alignment information.

8. Apparatus according to claim 7, in which said at least two image pickup means are video cameras.

9. Apparatus according to claim 7, in which each of said image pickup means is arranged to pick up an image of an area including both edges of the web.

10. Apparatus according to claim 7, in which said means, connected to said pickup means, comprises control means responsive to said signals, for adjusting the alignment of the web.

11. Apparatus according to claim 7, in which said means, connected to said pickup means, comprises display means for displaying reproduced images of said web in juxtaposition to one another, whereby the extent of lateral misalignment of the web is indicated by misalignment of the images of said edge.

12. Apparatus according to claim 11, in which the display means comprises a split screen monitor.

13. Apparatus for detecting a lateral alignment of a longitudinally moving web comprising:

first camera means, located above the surface of a web, for generating a first video signal representing a lateral position of at least one edge of the web;

second camera means, located above the surface of the web, and longitudinally spaced along said web from said first camera means, and positioned at substantially the same height above the web as said first camera means, for generating a second video signal representing a lateral position of at least one edge of the web; and monitoring means, connected to said first and second camera means, for receiving both said first and second video signals, and displaying reproduced images of portions of said web in juxtaposition to one another whereby lateral shifts in the web can be visually detected by comparing the juxtaposed images on said monitoring means.

* * * * *